(12) United States Patent
Otani et al.

(10) Patent No.: US 7,751,788 B2
(45) Date of Patent: Jul. 6, 2010

(54) TOOL-LESS SNAP-IN MODULAR REPLACEABLE KEYPAD FOR WIRELESS COMMUNICATION DEVICE AND METHOD OF ASSEMBLING SAME

(75) Inventors: Kazuyoshi R. Otani, San Diego, CA (US); Scott H. Plunkett, Ramona, CA (US)

(73) Assignee: Kyocera Corporation, Kyoto (JP)

( * ) Notice: Subject to any disclaimer, the term of this patent is extended or adjusted under 35 U.S.C. 154(b) by 672 days.

(21) Appl. No.: 11/627,855

(22) Filed: Jan. 26, 2007

(65) Prior Publication Data
US 2008/0182631 A1 Jul. 31, 2008

(51) Int. Cl.
*H04B 1/18* (2006.01)
(52) U.S. Cl. .......... 455/186.2; 455/90.3; 455/550.1; 455/557; 455/566; 455/575.1; 345/168; 345/169; 379/428.01; 379/433.01; 379/433.06; 379/433.07; D14/137; D14/392; D14/140; D14/240; D14/247; D14/346; D14/338; D14/399; D14/455

(58) Field of Classification Search ............. 345/168, 345/169; 455/90.3, 550.1, 557, 566, 575, 455/575.1, 186.2; D14/137, 138, 140, 240, D14/247, 392, 346, 338, 399, 455; 379/428.01, 379/433.01, 433.06, 433.07
See application file for complete search history.

(56) References Cited

U.S. PATENT DOCUMENTS

| 4,892,981 | A | | 1/1990 | Soloway et al. |
| D496,642 | S | * | 9/2004 | Harries et al. ........ D14/138 AA |
| 2003/0119543 | A1 | | 6/2003 | Kfoury et al. |
| 2005/0057513 | A1 | * | 3/2005 | Honkala et al. ............. 345/168 |

* cited by examiner

*Primary Examiner*—Dwayne Bost
*Assistant Examiner*—Pierre-Louis Desir

(57) ABSTRACT

A wireless communication device includes a wireless communication device housing member, and a modular keypad removably attachable to the wireless communication device housing member without use of a separate tool.

10 Claims, 4 Drawing Sheets

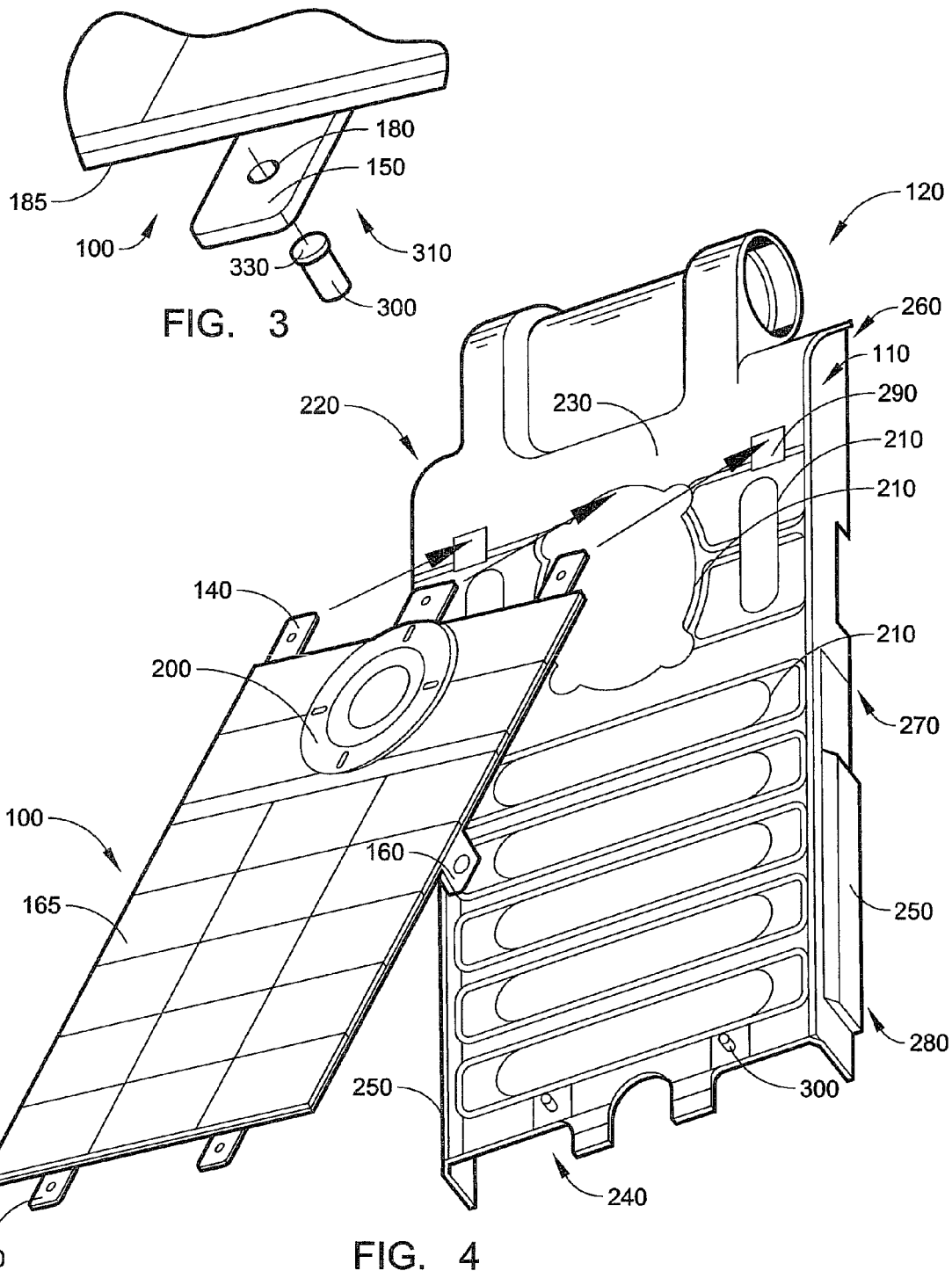

US 7,751,788 B2

TOOL-LESS SNAP-IN MODULAR REPLACEABLE KEYPAD FOR WIRELESS COMMUNICATION DEVICE AND METHOD OF ASSEMBLING SAME

FIELD OF THE INVENTION

The present invention generally relates to wireless communication devices and more particularly to keypads for wireless communication devices.

BACKGROUND

Keypads for wireless communications devices (e.g., cellular handsets) have been installed in the past using double-sided tape and fixtures (e.g., tools).

Some keypads for wireless communications devices have included bendable tabs that protrude from the keypad housing. The tabs are bent into a first configuration to attach the keypad and keypad housing to a handset housing, and then the tabs are bent again to secure the keypad housing and keypad in place relative to the handset housing.

Installation/assembly of the keypads in either of the above manners described above is cumbersome and time-consuming. Further, adhesives are sensitive to weather conditions and climate, and deteriorate over time.

SUMMARY

Accordingly, described herein is a modular keypad for a wireless communications device that is much easier and quicker to assemble than keypads in the past. The modular keypad does not require tape, tools, or other extra items to assemble the keypad into the wireless communications device. The modular keypad and device housing include snap fastening mechanisms that allow the modular keypad to be retained to the device housing. The modular keypad includes alignment members (e.g., engagement tabs, slots) for aligning the modular keypad into position relative to the device housing. The modular keypad is installed by sliding the modular keypad into position relative to the device housing using the alignment members, and snapping the snap fastening mechanisms together, locking the modular keypad into position relative to the device housing. A lower attachment member mates with the bottom of the modular keypad and device housing to prevent the modular keypad from accidentally separating from the device housing.

Not only is the modular keypad of the present invention easier and quicker to assemble than keypads in the past, but the snap fastening nature of the modular keypad makes the modular keypad replaceable so that an end user can easily remove and replace the modular keypad with a custom modular keypad of the user's preference. Further, if the modular keypad becomes worn out, the modular keypad can be replaced with a new modular keypad, without the user having to purchase a new wireless communication device.

Another aspect of the invention involves a wireless communication device including a wireless communication device housing member, and a modular keypad removably attachable to the wireless communication device housing member without use of a separate tool.

A further aspect of the invention involves a method of assembling a wireless communication device, the wireless communication device including a wireless communication device housing member and a modular keypad removably attachable to the wireless communication device housing member. The method includes inserting the modular keypad at least partially into the wireless communication device housing member; removably attaching the modular keypad to the wireless communication device housing member; and locking the modular keypad relative to the wireless communication device housing member. The inserting, attaching, and locking steps being performed without use of a separate tool.

Other features and advantages of the present invention will become more readily apparent to those of ordinary skill in the art after reviewing the following detailed description and accompanying drawings.

BRIEF DESCRIPTION OF THE DRAWINGS

The details of the present invention, both as to its structure and operation, may be gleaned in part by study of the accompanying drawings, in which like reference numerals refer to like parts, and in which:

FIG. 3 is partial perspective view of an embodiment of a snap fastening mechanism;

FIG. 4 is a front perspective view of the modular keypad of FIG. 1 and a wireless communication device housing member, and illustrates an assembly step for installing the modular keypad onto the wireless communication device housing member;

DETAILED DESCRIPTION

With reference to FIGS. 1-6, certain embodiments as disclosed herein provide for modular keypad 100 that is quickly and easily connected/disconnected relative to device housing member 110 of a wireless communication device. Although the modular keypad 100 will be described in conjunction with device housing member 110 of wireless communication device 120, in alternative embodiments, modular keypad 100 is connectable/disconnectable relative to a device housing of a device (e.g., PDA, hand-held computer)) other than a wireless communication device.

After reading this description it will become apparent to one skilled in the art how to implement the invention in various alternative embodiments and alternative applications. However, although various embodiments of the present invention will be described herein, it is understood that these embodiments are presented by way of example only, and not limitation. As such, this detailed description of various alternative embodiments should not be construed to limit the scope or breadth of the present invention as set forth in the appended claims.

Figure 1:
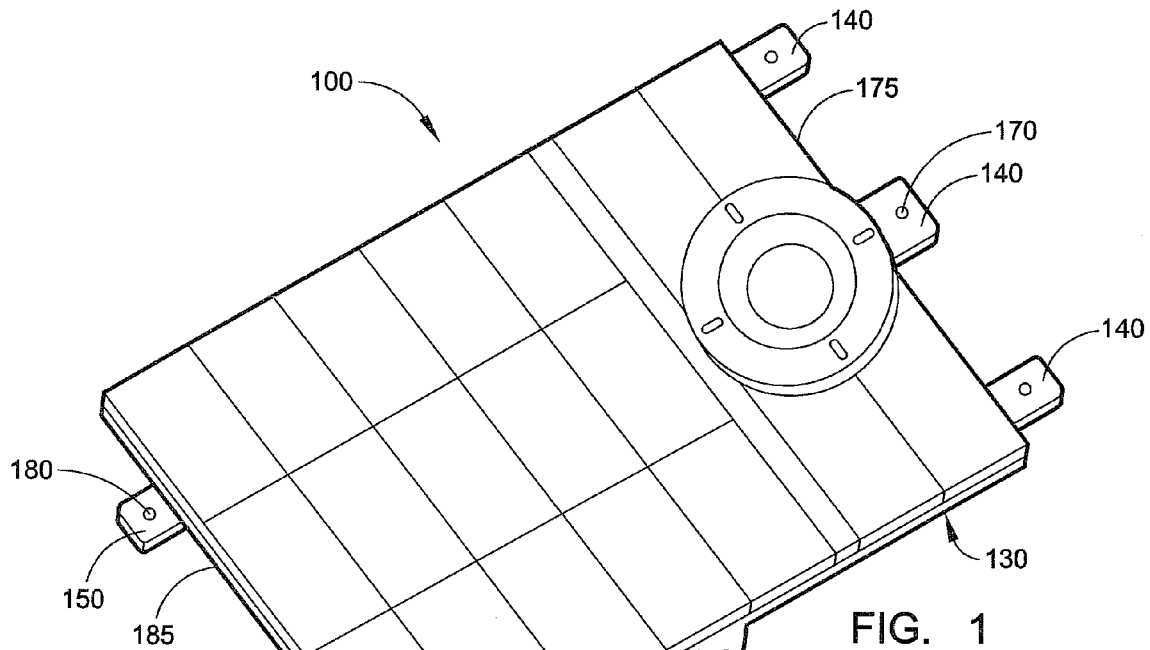
FIG. 1 is a front perspective view of an embodiment of a modular keypad for a wireless communication device.
Figure 2:
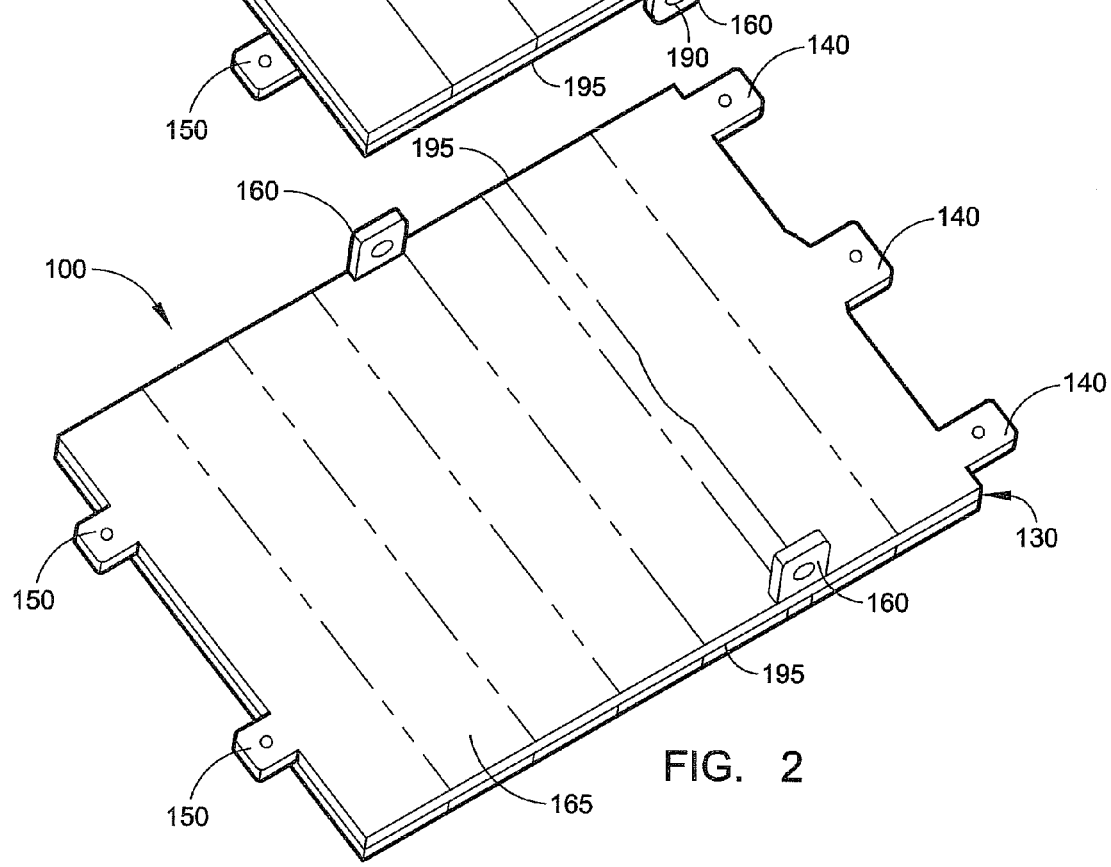
FIG. 2 is a rear perspective view of the modular keypad of FIG. 1.

With reference to FIGS. 1 and 2, an embodiment of modular keypad 100 will be described. Modular keypad 100 includes substantially rectangular support frame 130. Support frame 130 includes upwardly extending upper engagement tabs 140, downwardly extending lower engagement tabs 150, and rearwardly extending middle engagement tabs 160 extending rearward from rear 165.

Upwardly extending upper engagement tabs 140 have a substantially rectangular, flat configuration, and include central holes 170. Upper engagement tabs 140 extend upwardly from top end 175. Although three upper engagement tabs 140 are shown, in alternative embodiments, modular keypad 100 includes other numbers (e.g. 1, 2, 4, etc.) of upper engagement tabs 140. Further, in alternative embodiments, one or more of the upper engagement tabs 140 have alternative sizes and/or configurations.

Downwardly extending lower engagement tabs 150 have a substantially rectangular, flat configuration, and include central holes 180. Lower engagement tabs 140 extend downwardly from bottom end 185. Although two lower engagement tabs 150 are shown, in alternative embodiments, modular keypad 100 includes other numbers (e.g. 1, 3, 4, etc.) of lower engagement tabs 150. Further, in alternative embodiments, one or more of the lower engagement tabs 150 have alternative sizes and/or configurations.

Rearwardly extending middle engagement tabs 160 have a substantially curvilinear, flat configuration, and include central holes 190. The middle engagement tabs 160 extend rearwardly from opposite sides 195. Middle engagement tabs 160 are vertically offset relative to each other along opposite sides 195. Although two middle engagement tabs 160 are shown, in alternative embodiments, modular keypad 100 includes other numbers (e.g. 1, 3, 4, etc.) of middle engagement tabs 160. Further, in alternative embodiments, one or more of the middle engagement tabs 160 have alternative sizes and/or configurations.

In alternative embodiments, modular keypad 100 includes alternative numbers, configurations, and/or locations for engagement tabs.

One or more input keys 200 are operatively coupled to a front of the support frame 130.

In alternative embodiments, modular keypad 100 includes alternative numbers, configurations, and/or locations for input keys 200.

With reference to FIG. 3-6, wireless communication device housing member 110 includes a substantially rectangular configuration with input key holes 210 disposed relative to input keys 200, when the modular keypad 100 is attached to housing member 110. Housing member 110 includes a substantially rectangular configuration with front side 230, rear side 240, opposite sides 250, top portion 260, middle portion 270, and bottom portion 280. Top portion 220 includes upper slots 290 for receiving upper engagement tabs 140. Although not shown, adjacent upper slots 290, on rear side 220, engagement pins extend rearwardly from rear side 220. Middle portion 270 includes slots (not shown) adjacent opposite sides 250 for receiving middle engagement tabs 160. In bottom portion 280, on front side 230, engagement pins 300 extend forwardly from front side 230. Lower engagement tabs 320 extend downwardly from bottom edge 325 of housing member 110.

As shown in FIG. 3, together, holes 180 of lower engagement tab 150 and engagement pins 300 form snap fastening mechanisms 310. In the embodiment shown, a distal end of engagement pin 300 includes increased-diameter tip 330. Increased-diameter tip 330 allows hole 180 of engagement tab 150 to "snap" onto engagement pin 300 and be retained in position on engagement pin 300. Engagement pins on rear side 240, adjacent upper slots, have a similar configuration to engagement pins 300, and together with holes 170 of upper engagement tabs 140 for snap fastening mechanisms.

Figure 6:
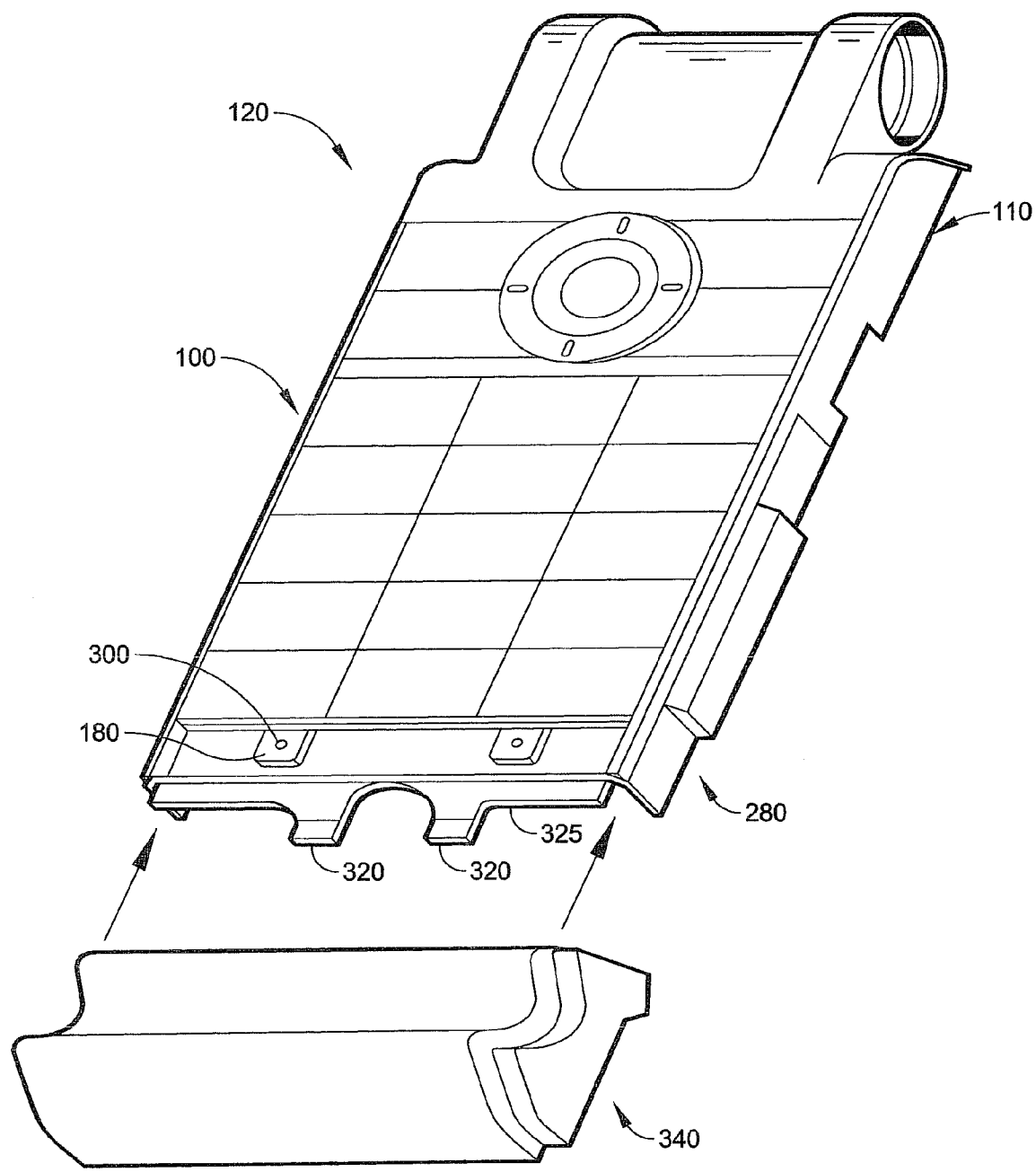
FIG. 6 is a front perspective view of the modular keypad of FIG. 1 attached to the wireless communication device housing member and a lower attachment member, and illustrates another assembly step involving attaching the lower attachment member to the bottom of the modular keypad and housing.

As shown in FIG. 6, lower attachment member 340 slidably connects to bottom portion 280 of housing member 110. Lower attachment member 340 includes recesses, slots, and/or tracks (not shown) on an upper side that slidably receive lower engagement tabs 320 and other portions of bottom portion 280 of housing member 110.

Figure 5:
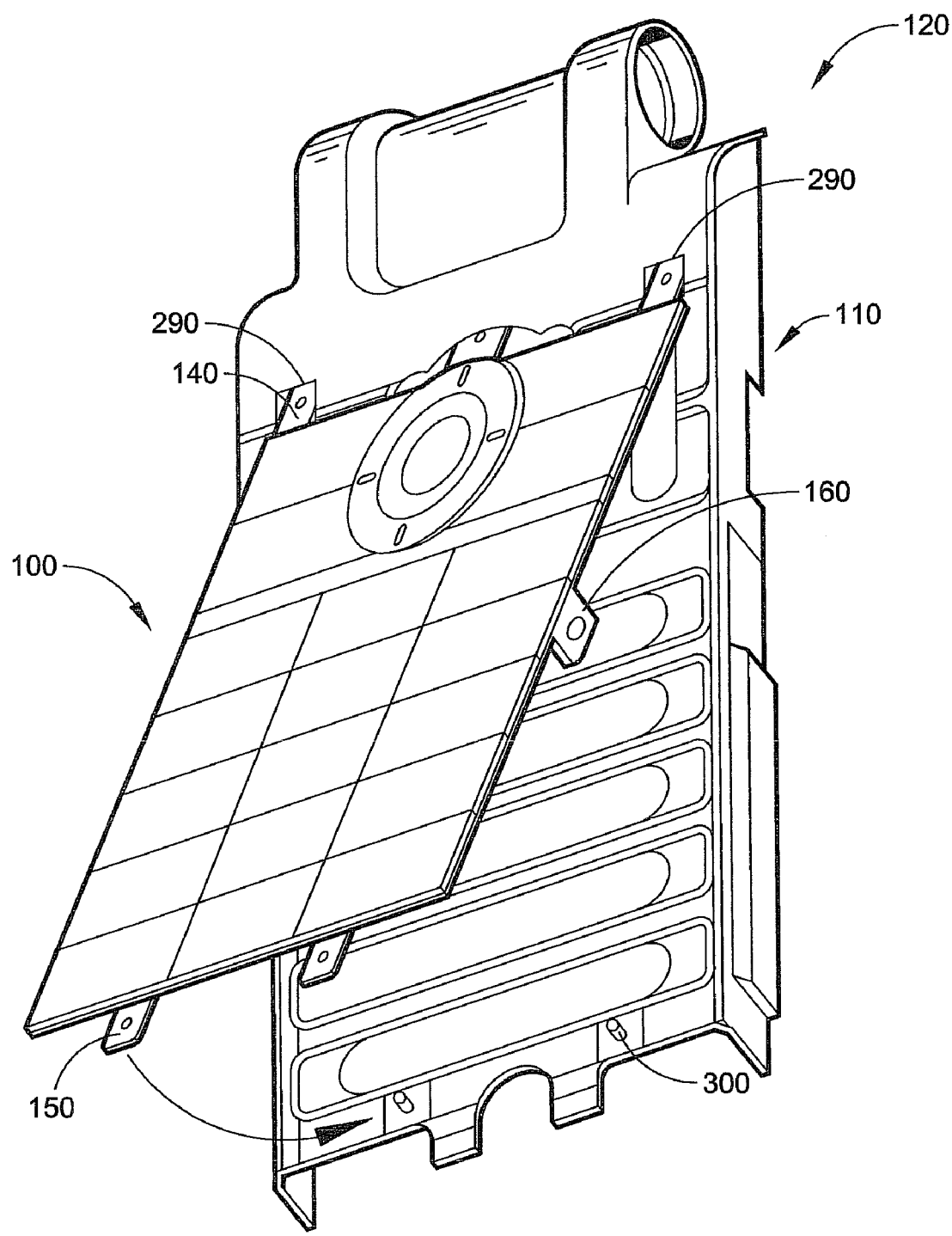
FIG. 5 is a perspective view of the modular keypad of FIG. 1 and the wireless communication device housing member, and illustrates another assembly step for installing the modular keypad onto the wireless communication device housing member.

With reference to FIGS. 3-6, an exemplary method of assembling modular keypad 100 to device housing member 110 will be described. First, as shown in FIG. 4, the modular keypad 100 is oriented in the position shown so that upper engagement tabs 140 are aligned with slots 290, and the modular keypad 100 is disposed over device housing member 110. Then, as shown in FIG. 5, modular keypad 100 is angled relative to device housing member 110, and upper engagement tabs 140 are first inserted into or slid into slots 290. Central upper engagement tab 140 is disposed into a top of central input key hole 210. Slots 290 receive upper engagement tabs 140. Modular keypad 100 is then pivoted downward, with upper engagement tabs 140 in slots 290 serving as pivot points. As modular keypad 100 is pivoted downward, towards front side 230, slots in middle portion 270 receive middle engagement tabs. Modular keypad 100 is pivoted downward so that rear 165 of modular keypad 100 is adjacent to front 230 of device housing member 110. Then, during a snapping step, snap fastening mechanisms 310 are snapped into position. This includes ensuring holes 180, 170, of engagement tabs 150, 140 are over engagement pins 300, and then pressing modular keypad 100 and device housing member 110 together in the location of the snap fastening mechanisms 310 so that the holes 180, 170 of engagement tabs 150, 140 are snapped onto the engagement pins 300, securing the modular keypad 100 in position relative to device housing member 110. With reference to FIG. 6 in a locking step, lower attachment member 340 is slidably connected to bottom portion 280 of housing member 110. Lower engagement tabs 320 and other portions of bottom portion 280 matingly receive recesses, slots, and/or tracks of lower attachment member 340. With lower attachment member 340 secured in position on bottom portion 280, modular keypad 100 is locked into position, preventing modular keypad 100 from being dislodged relative to housing member 110.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly limited by nothing other than the appended claims.

What is claimed is:

1. A wireless communication device, comprising:
a wireless communication device housing member;
a modular keypad removably attachable to the wireless communication device housing member without use of a separate tool;
wherein at least one of the wireless communication device housing member and the modular keypad include at least one fastening mechanism to removably attach the modular keypad to the wireless communication device housing member, at least one fastening mechanism includes at least one snap fastening mechanism to removably attach the modular keypad to the wireless communication device housing member through at least one snap connection, at least one snap fastening mechanism includes an engagement tab with a hole therein, and an engagement pin that snaps into and out of the hole in the engagement tab to removably attach the modular keypad to the wireless communication device housing member, the engagement pin includes an enlarged head member extending on an opposite side of the hole from the rest of the engagement pin to retain the engagement tab to the engagement pin.

2. The wireless communication device of claim 1, wherein at least one of the wireless communication device housing member and the modular keypad include at least one slot for receiving the engagement tab of the at least one snap fastening mechanism.

3. The wireless communication device of claim 2, wherein when the engagement tab is received in the slot the modular keypad is pivotal relative to the wireless communication device housing member.

4. The wireless communication device of claim 1, wherein the modular keypad includes at least one input key, and the wireless communication device housing member includes at least one hole therein corresponding to the at least one input key to allow operative association between the at least one input key and a circuit board for input into the wireless communication device.

5. The wireless communication device of claim 1, wherein the wireless communication device housing includes a bottom portion and further including a lower attachment member that is removably attachable to the bottom portion of the wireless communication device housing to secure the modular keypad in position.

6. A method of assembling a wireless communication device, the wireless communication device including a wireless communication device housing member and a modular keypad removably attachable to the wireless communication device housing member, comprising:
    inserting the modular keypad at least partially into the wireless communication device housing member by positioning the modular keypad at an angle relative to the wireless communication device housing member and inserting one or more upper engagement tabs at an upper end of the modular keypad into one or more upper slots in an upper end of the wireless communication device housing member;
    removably attaching the modular keypad to the wireless communication device housing member; and
    locking the modular keypad relative to the wireless communication device housing member, wherein the inserting, attaching, and locking steps are performed without use of a separate toot wherein at least one of the wireless communication device housing member and the modular keypad include at least one snap fastening mechanism, the at least one snap fastening mechanism including an engagement tab with a hole therein and an engagement pin that snaps into and out of the hole in the engagement tab, the engagement pin includes an enlarged head member extending on an opposite side of the hole from the rest of the engagement pin to retain the engagement tab to the engagement pin, and removably attaching the modular keypad to the wireless communication device housing member occurs by snapping the engagement pin into and out of the hole in the engagement tab.

7. The method of claim 6, wherein removably attaching the modular keypad to the wireless communication device housing member includes snapping the modular keypad and the wireless communication device housing member together.

8. The method of claim 6, wherein at least one of the wireless communication device housing member and the modular keypad include at least one slot for receiving the engagement tab of the at least one snap fastening mechanism, and inserting the modular keypad at least partially into the wireless communication device housing member includes inserting the engagement tab of the at least one snap fastening mechanism into the at least one slot.

9. The method of claim 6, wherein the modular keypad includes at least one input key, and the wireless communication device housing member includes at least one hole, and when the modular keypad is removably attached to the wireless communication device housing member the at least one hole of the wireless communication device housing member corresponds to the at least one input key to allow operative association between the at least one input key and a circuit board for input into the wireless communication device.

10. The method of claim 9, wherein the wireless communication device housing includes a bottom portion and the wireless communication device includes a lower attachment member that is removably attachable to the bottom portion of the wireless communication device housing, and locking the modular keypad relative to the wireless communication device housing member includes removably attaching the lower attachment member to the wireless communication device housing to secure the modular keypad in position.

* * * * *